US012433199B2

(12) United States Patent
Jordan

(10) Patent No.: US 12,433,199 B2
(45) Date of Patent: Oct. 7, 2025

(54) SELF-PROPELLED WHEEL RAKE

(71) Applicant: Jordan Farms Manufacturing LLC, Cedar City, UT (US)

(72) Inventor: Ben Rich Jordan, Cedar City, UT (US)

(73) Assignee: JORDAN FARMS MANUFACTURING LLC, Cedar City, UT (US)

(*) Notice: Subject to any disclaimer, the term of this patent is extended or adjusted under 35 U.S.C. 154(b) by 0 days.

(21) Appl. No.: 18/504,023

(22) Filed: Nov. 7, 2023

(65) Prior Publication Data
US 2024/0147908 A1 May 9, 2024

Related U.S. Application Data

(60) Provisional application No. 63/423,398, filed on Nov. 7, 2022.

(51) Int. Cl.
A01D 78/14 (2006.01)
A01D 80/00 (2006.01)

(52) U.S. Cl.
CPC ........... *A01D 80/00* (2013.01); *A01D 78/146* (2013.01)

(58) Field of Classification Search
CPC ........ A01D 78/00–78/20; A01D 80/00; A01D 51/00; A01D 51/002; A01D 67/00; A01D 57/12; A01D 78/14–148; A01D 78/146; A01B 59/00–59/069; A01B 63/00–63/32; A01B 69/00–69/028; A01B 73/00–73/067
See application file for complete search history.

(56) References Cited

U.S. PATENT DOCUMENTS

| | | | | |
|---|---|---|---|---|
| 2,929,187 A * | 3/1960 | Boggio | ................. | A01D 78/04 56/15.1 |
| 2,934,874 A * | 5/1960 | Lintz | .................... | A01D 45/001 56/246 |
| 3,893,286 A * | 7/1975 | Buttram | ............... | A01D 51/002 15/82 |
| 3,961,469 A * | 6/1976 | McRobert | ............. | A01D 51/00 15/82 |
| 4,077,189 A * | 3/1978 | Hering | .................. | A01D 43/02 56/341 |
| 4,183,198 A * | 1/1980 | Sligter | .................. | A01D 78/14 56/377 |
| 4,214,428 A * | 7/1980 | Caraway | ................ | A01D 57/12 56/341 |

(Continued)

FOREIGN PATENT DOCUMENTS

DE 2359224 A1 * 6/1975
DE 2628598 A1 * 12/1977
(Continued)

*Primary Examiner* — Joseph M Rocca
*Assistant Examiner* — Madeline I Runco
(74) *Attorney, Agent, or Firm* — David R. Conklin; Kirton McConkie

(57) ABSTRACT

A self-propelled wheel rake may include a cab that may be mounted to or otherwise secured to a main body. The cab or the main body may include a powerhouse for propelling the wheel rake along the ground. The cab and main body can be positioned between or behind opposing rake arm assemblies of the wheel rake. The cab can be configured to allow an operator to sit or stand while operating the wheel rake.

12 Claims, 13 Drawing Sheets

(56) References Cited

U.S. PATENT DOCUMENTS

| | | | | |
|---|---|---|---|---|
| 4,502,270 A * | 3/1985 | Shupert | ............... | A01D 63/00 56/119 |
| 4,505,096 A * | 3/1985 | Brown | ............... | A01D 51/00 56/328.1 |
| 4,753,063 A * | 6/1988 | Buck | ............... | A01D 78/144 56/370 |
| 5,966,916 A * | 10/1999 | Laing | ............... | A01D 78/146 56/341 |
| 5,987,864 A * | 11/1999 | Lutz | ............... | A01D 78/146 56/377 |
| 7,131,254 B2 * | 11/2006 | Flora | ............... | A01D 51/002 56/13.1 |
| 7,412,817 B2 * | 8/2008 | Flora | ............... | A01D 51/002 56/328.1 |
| 8,495,856 B2 * | 7/2013 | Collins | ............... | A01D 78/144 56/396 |
| 9,788,490 B2 * | 10/2017 | Jordan | ............... | A01D 78/146 |
| 11,231,317 B2 * | 1/2022 | Hunt | ............... | G01P 3/00 |
| 2005/0055995 A1 * | 3/2005 | Kappel | ............... | A01D 78/146 56/375 |
| 2014/0237972 A1 * | 8/2014 | Collins | ............... | A01D 89/007 56/16.7 |
| 2016/0212942 A1 * | 7/2016 | Gilbert | ............... | A01D 51/002 |
| 2016/0242359 A1 * | 8/2016 | Jordan | ............... | A01D 78/1014 |
| 2017/0105330 A1 * | 4/2017 | Mashburn | ............... | A01D 78/14 |
| 2018/0317390 A1 * | 11/2018 | Schiferl | ............... | A01D 78/14 |
| 2019/0047345 A1 * | 2/2019 | Dockter | ............... | A01F 15/07 |
| 2022/0128404 A1 | 4/2022 | Hunt et al. | | |
| 2022/0322606 A1 * | 10/2022 | Rhodes | ............... | E02F 3/96 |
| 2022/0361393 A1 * | 11/2022 | Friesen | ............... | A01B 63/245 |

FOREIGN PATENT DOCUMENTS

| | | | | |
|---|---|---|---|---|
| EP | 3165406 A1 * | 5/2017 | ......... | A01B 69/001 |
| EP | 3351429 | 7/2018 | | |
| WO | 2015108505 | 7/2015 | | |

* cited by examiner

SELF-PROPELLED WHEEL RAKE

CROSS-REFERENCE TO RELATED APPLICATIONS

This application claims the benefit of U.S. Provisional Patent Application No. 63/423,398 which was filed on Nov. 7, 2022, and which is incorporated herein in its entirety.

BACKGROUND

A hay rake is farm equipment that is used to rake hay into windrows, or rows of hay, that can more easily be picked up by a baler. Various types of hay rakes exist including wheel rakes, parallel bar rakes, rotary rakes, and belt rakes. Wheel rakes are most common due to their speed and low cost. FIG. 1 provides an example of a wheel rake. As shown, a tractor 10 is used to pull a wheel rake 20 that is separate from the tractor. Wheel rake 20 includes a main body 21 with a front portion 21a that is configured to attach to tractor 10, wheels 22 that support main body 21, and support arms 23 that extend outwardly from main body 21. Opposing rake arms 24 are mounted to support arms 23 and are oriented in a V-shape during use. Tine arms 25 are attached to rake arms 24 and support tine wheels 26 in an overlapping configuration. As tractor 10 pulls wheel rake 20, tine wheels 26 are rotated (e.g., via hydraulics or driven by contact with the ground) to cause their teeth to rake cut hay into a windrow 30.

BRIEF SUMMARY

The present invention extends to a self-propelled wheel rake. A self-propelled wheel rake may include a cab that may be mounted to or otherwise secured to a main body. The cab or the main body may include a powerhouse for propelling the wheel rake along the ground. The cab and main body can be positioned between or behind opposing rake arm assemblies of the wheel rake. The cab can be configured to allow an operator to sit or stand while operating the wheel rake.

In some embodiments, the present invention may be implemented as a wheel rake that includes a main body having a powerhouse for propelling the wheel rake along the ground, a cab that is configured to accommodate an operator, and opposing rake arm assemblies between which the cab is positioned. Each rake arm assembly may support a plurality of tine wheels.

In some embodiments, the cab may include controls for steering the wheel rake.

In some embodiments, the cab may include multiple sets of controls for steering the wheel rake.

In some embodiments, the cab may include an enclosure and a door.

In some embodiments, the wheel rake may include a primary support assembly that supports the main body, the cab, and the opposing rake arm assemblies.

In some embodiments, the primary support assembly may include opposing vertical support assemblies that support the opposing rake arm assemblies.

In some embodiments, the primary support assembly may be configured to extend and retract the opposing rake arm assemblies between a V-shaped position and a parallel position.

In some embodiments, the primary support assembly may include a plurality of actuators that extend and retract the opposing rake arm assemblies.

In some embodiments, each vertical support assembly may include a wheel.

In some embodiments, the wheels of the vertical support assemblies may be drivable to cause the wheel rake to turn.

In some embodiments, the wheel rake may include a rear support assembly that supports the opposing rake arm assemblies.

In some embodiments, the rear support assembly may also support the main body and the cab.

In some embodiments, the rear support assembly may include one or more rear wheels.

In some embodiments, each of the opposing rake arm assemblies may include a rake arm and each rake arm may form a rear coupling point at which the rake arm is coupled to the rear support assembly.

In some embodiments, each of the rake arms may be configured to pivot at the rear coupling point when the opposing rake arm assemblies are extended from and retracted towards the main body.

In some embodiments, the present invention may be implemented as a wheel rake that includes opposing rake arm assemblies with each rake arm assembly supporting a plurality of tine wheels, a main body having a powerhouse for propelling the wheel rake along the ground, and controls by which an operator can control the wheel rake. The controls may be positioned between the opposing rake arm assemblies such that the operator is between the opposing rake arm assemblies when the wheel rake is used to rake hay.

In some embodiments, the wheel rake may include a cab positioned between the opposing rake arm assemblies, and the controls may be located in the cab.

In some embodiments, the wheel rake may include a primary support assembly that is configured to support the opposing rake arm assemblies and the main body. The primary support assembly may include wheels that can be driven to cause the wheel rake to turn.

In some embodiments, the wheel rake may include a rear support assembly that is configured to support the opposing rake arm assemblies. The rear support assembly may include one or more rear wheels.

In some embodiments, the primary support assembly may include one or more actuators that are configured to pivot the opposing rake arm assemblies between a parallel position and a V-shaped position.

In some embodiments, the present invention may be implemented as a method for raking hay. At a first time, hay may be raked to form parallel windrows. Then, at a second time, the parallel windrows can be raked to form a single windrow. In some embodiments, the parallel windrows may be between 4 and 5 feet apart.

In some embodiments, the present invention may be implemented as a wheel rake that includes a main body, a cab supported by the main body, and opposing rake arm assemblies that extend from the main body. Each rake arm assembly can include a rake arm that is coupled to the main body in front of the cab.

In some embodiments, the main body may include a cross support on which the cab is supported.

In some embodiments, the main body may include vertical supports on opposite ends of the cross support.

In some embodiments, the main body may include an upper support arm and a lower support arm that extend frontwardly from each vertical support.

In some embodiments, each rake arm assembly may include a vertical connection member that is connected to the main body between the respective upper and lower support arms.

In some embodiments, the vertical connection member may rotate relative to the respective upper and lower support arms.

In some embodiments, a rear end of the rake arm may connect to a lower end of the respective vertical connection member and each rake arm assembly may include a reinforcing arm that connects to an upper end of the respective vertical connection member.

In some embodiments, the cab may include a steering component that is adjustable between a standing position, a sitting position, and a hands-free position.

In some embodiments, the wheel rake can include stairs on one or both sides of the cab.

In some embodiments, the wheel rake can include lights on top of the cab.

In some embodiments, the wheel rake can include lights that extend frontwardly from the cab towards a bottom of the cab.

In some embodiments, the wheel rake can include one or more lights on each rake arm.

In some embodiments, each rake arm may be independently pivotable relative to the main body.

In some embodiments, the wheel rake may include a control system for independently pivoting each rake arm.

In some embodiments, the wheel rake may include wheels that support the main body off the ground and wheels that support the rake arms off the ground.

In some embodiments, the wheels that support the rake arms off the ground may be independently steerable.

In some embodiments, the present invention may be implemented as a wheel rake that includes a main body that is supported off the ground by a first set of wheels, a cab supported by the main body, and opposing rake arm assemblies that are supported off the ground by a second set of wheels. Each rake arm assembly can be connected to the main body in front of the cab such that tine wheels connected to rake arms of the rake arm assemblies are positioned in front of the cab.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

Figure 2:
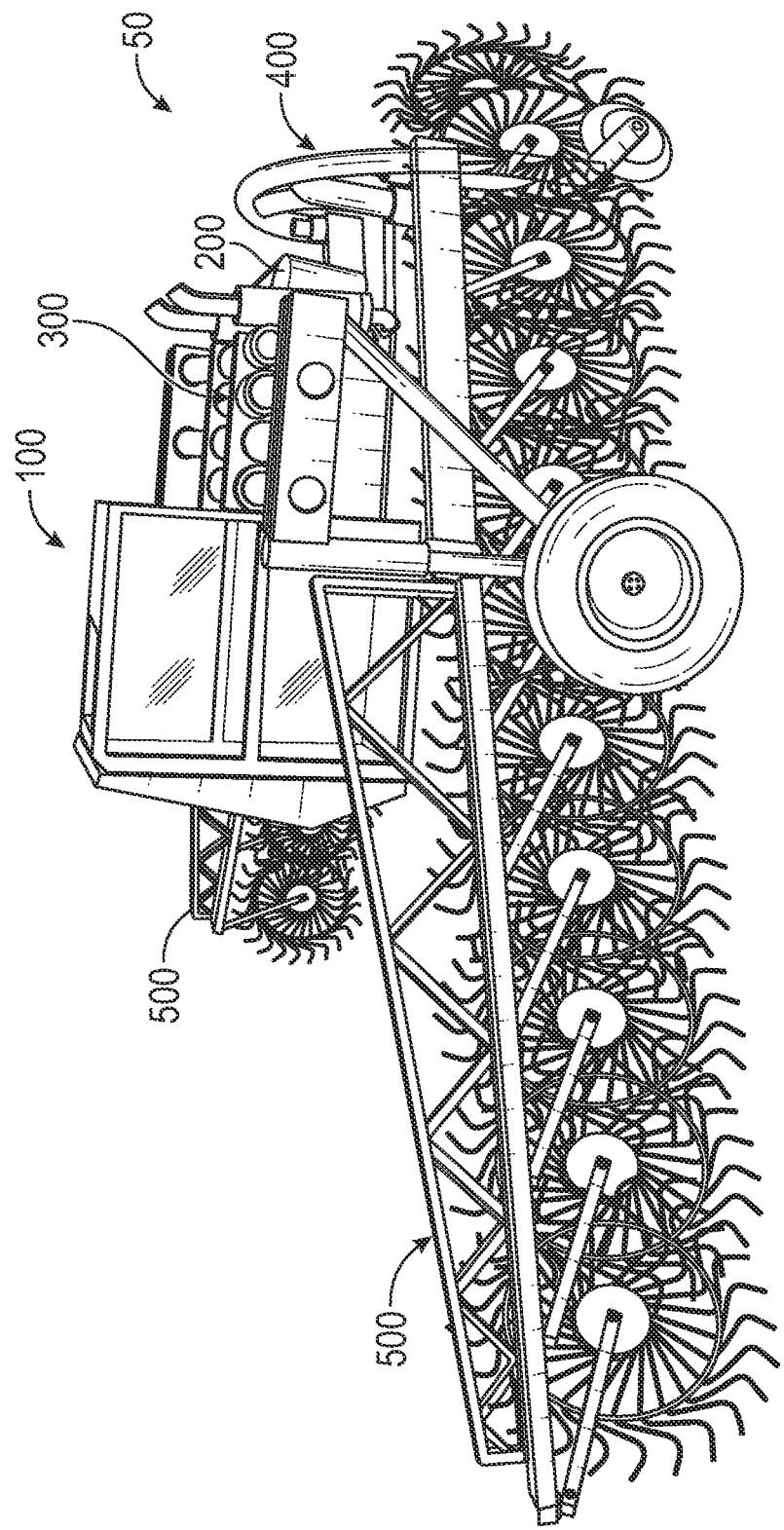
FIG. 2 is a side view of a self-propelled wheel rake configured in accordance with one or more embodiments of the present invention.

Embodiments of the present invention extend to a self-propelled wheel rake and corresponding techniques that allow a wheel rake to be used independently of a tractor. FIG. 2 provides an example of a self-propelled wheel rake 50 (or wheel rake 50) that is configured in accordance with embodiments of the present invention.

Wheel rake 50 includes a cab 100 that may be mounted to or otherwise secured from a front side of a main body 200. Main body 200 can house one or more engines, motors, or other powerhouses for propelling wheel rake 50 along the ground and driving its various components. Wheel rake 50 may also include a primary support assembly 300, a rear support assembly 400, and rake arm assemblies 500. Primary support assembly 300 and rear support assembly 400 can be configured to support cab 100, main body 200, and each rake arm assembly 500 off the ground.

Figure 3:
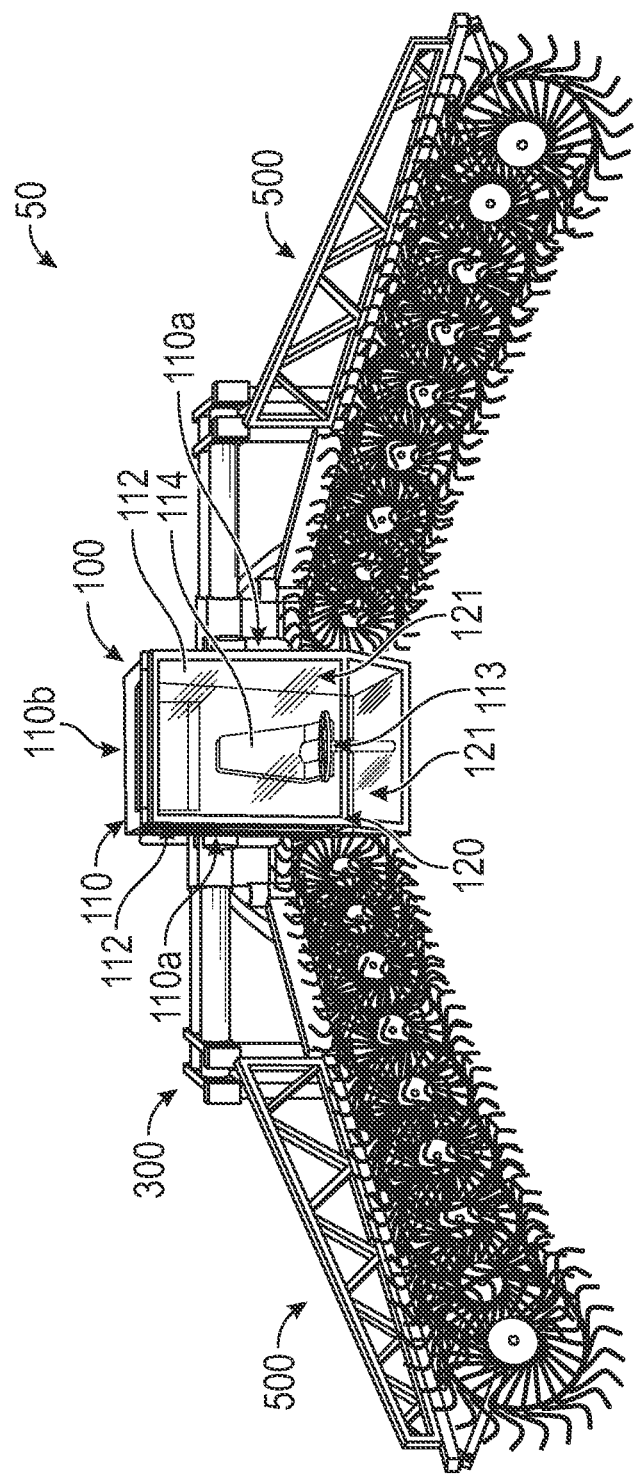
FIG. 3 is a front view of a self-propelled wheel rake of FIG. 2.

FIG. 3 provides an example of how cab 100 may be configured in one or more embodiments. In FIG. 3, primary support assembly 300 has caused rake arm assemblies 500 (or rake arms 510 as described with reference to FIGS. 5A and 5B) to be pivoted outwardly to create a V-shape for raking hay into a windrow. Cab 100 is positioned between rake arm assemblies 500 such that it would be positioned overtop the windrow as it is being formed. Cab 100 generally includes an enclosure 110 and a door 120 for gaining access to enclosure 110. A ladder or other mechanism for climbing into enclosure 110 may be selectively lowered from enclosure 110. A rear 110b of enclosure 110 may be coupled to or otherwise supported by main body 200. Sides 110a of enclosure 110 may be formed of one or more windows 112 which may span the height of enclosure 110 to thereby enable an operator to see outwardly to the sides and back of cab 100. Door 120 may also be formed of one or more windows 121 which span the height of door 120 to thereby allow the operator to see frontwardly. Accordingly, the operator can have a full view of the hay as it is being raked.

Controls 113 may be positioned within enclosure 110 to enable the operator to control wheel rake 50. Controls 113 may include a steering wheel or other steering mechanism (e.g., foot pedals), hydraulic controls for actuating various hydraulic components, speed controls, etc. Controls 113 may be configured to enable an operator to sit or stand. For example, a height of controls 113 could be adjusted based on whether the operator is standing or seated in seat 114. In some embodiments, cab 100 may include more than one set of controls 113 (e.g., for steering). For example, one set of controls 113 could be active when the operator is seated in seat 114, whereas another set of controls 113 could be active when the operator is standing. In such embodiments, the position of a set of controls 113 (e.g., a steering wheel) could dictate which set of controls 113 is active (e.g., by folding down a steering wheel for use when seated to activate a steering wheel for use when standing).

Figure 4:
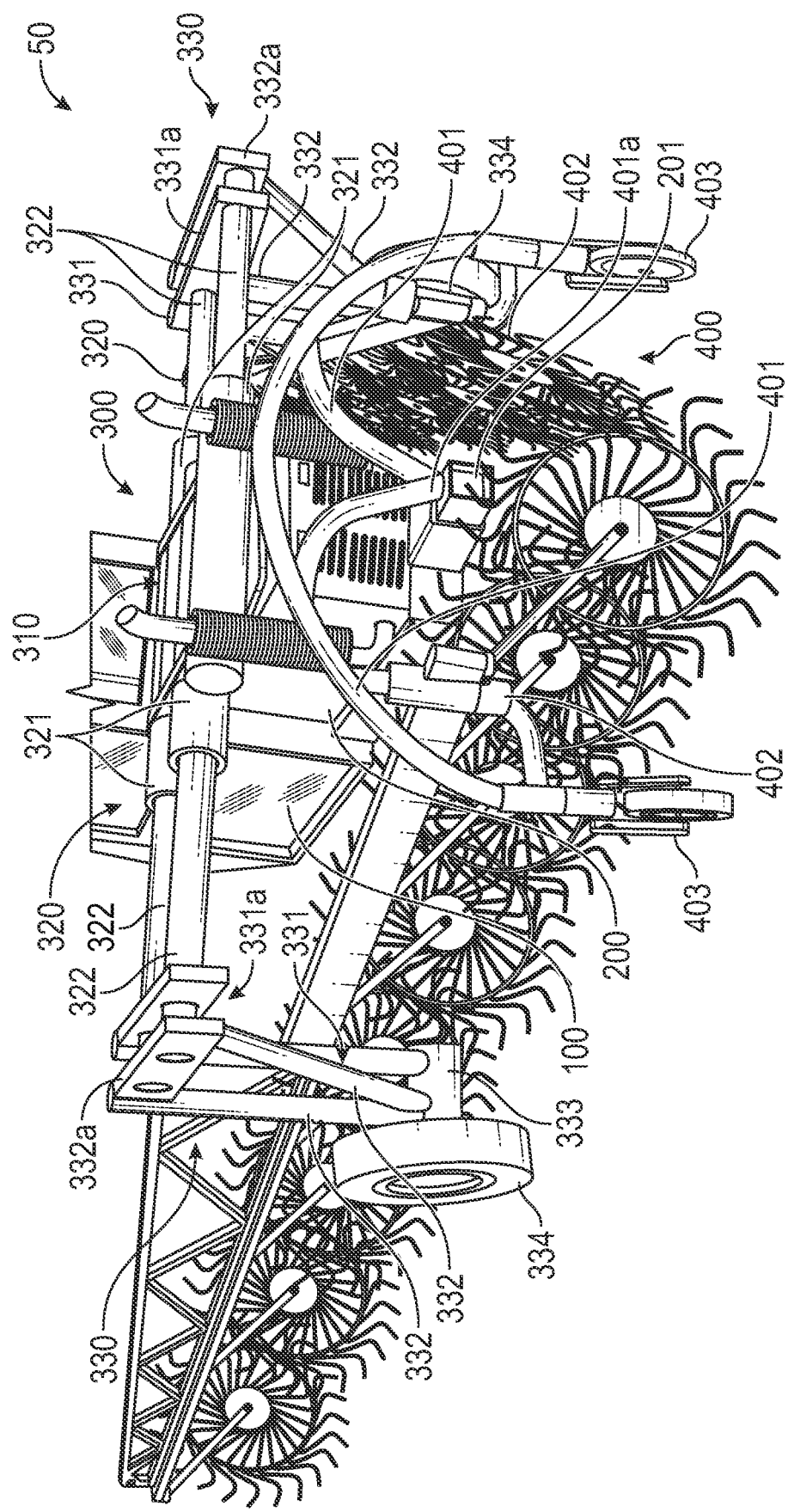
FIG. 4 is a rear perspective view of a self-propelled wheel rake of FIG. 2.

FIG. 4 provides an example of how primary support assembly 300 and rear support assembly 400 may be configured in one or more embodiments. Primary support assembly 300 can include a housing 310 which may support actuators 320 on top of main body 200. For example, each actuator 320 may include a cylinder 321 that is supported on top of main body 200 and oriented outwardly along with a rod 322 that travels within cylinder 321. In the depicted example, a pair of actuators 320 extend from each side of housing 310 but other numbers of actuators 320 could be used. Primary support assembly 300 may also include opposing vertical support assemblies 330 to which rods 322 are secured. Accordingly, actuators 320 can be actuated to cause vertical support assemblies 330 to be extended away from and retracted towards main body 200.

Each vertical support assembly 330 may include one or more inner vertical support members 331 and one or more outer vertical support members 332 that extend upwardly from an axle 333 to which a wheel 334 is mounted. An inner horizontal support member 331a may extend from inner vertical support member(s) 331, and an outer horizontal support member 332a may extend from outer vertical support member(s) 332. Rods 322 of respective actuators 320 may insert through or otherwise be coupled to inner horizontal support member 331a and outer horizontal support member 332a to cause vertical support assembly 330 to move with rods 322.

Rear support assembly 400 may include a support arm 401 that is coupled to main body 200 and extends outwardly beyond rake arm assemblies 500. In some embodiments, support arm 401 may have an inverted U-shape with rear wheels 403 coupled to its ends and an inner support member 401a that couples to a rear extension 201 of main body 200. Rear support assembly 400 may also include coupling members 402 by which rake arm assemblies 500 are coupled to and supported from support arm 401. In some embodiments, rear wheels 403 may be in the form of casters which may facilitate the turning of wheel rake 50 as described in detail below.

Figure 5A:
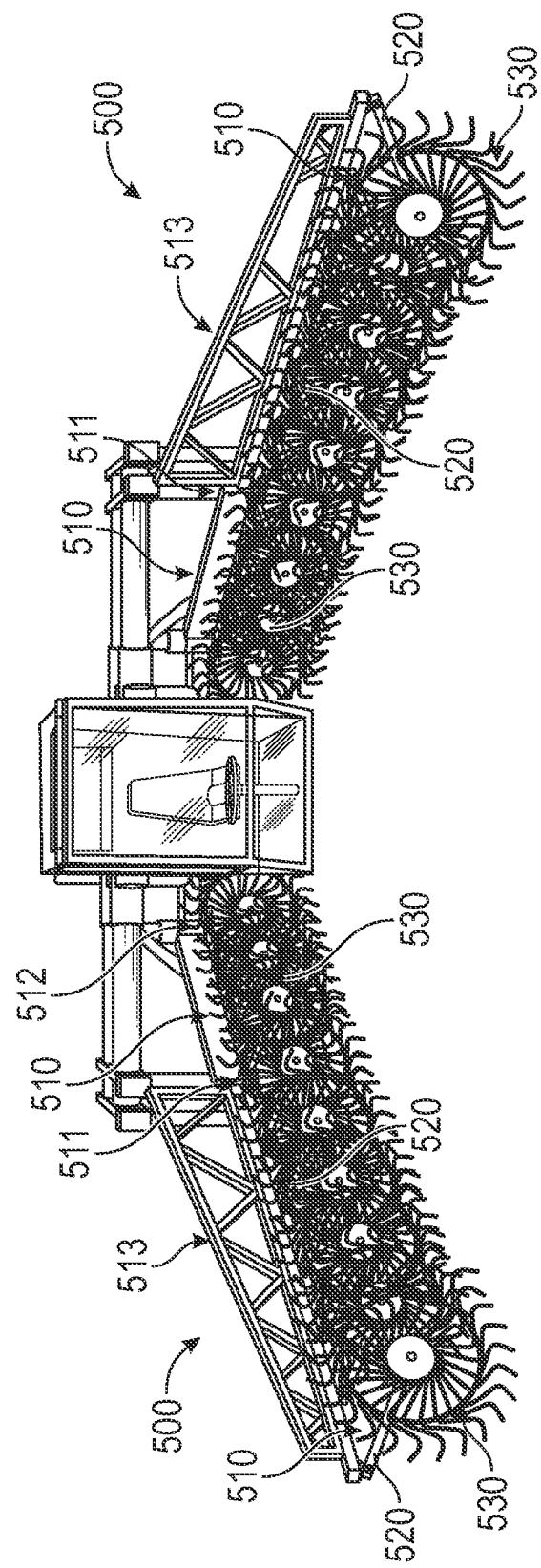
FIG. 5A is a front view of a self-propelled wheel rake of FIG. 2.
Figure 5B:
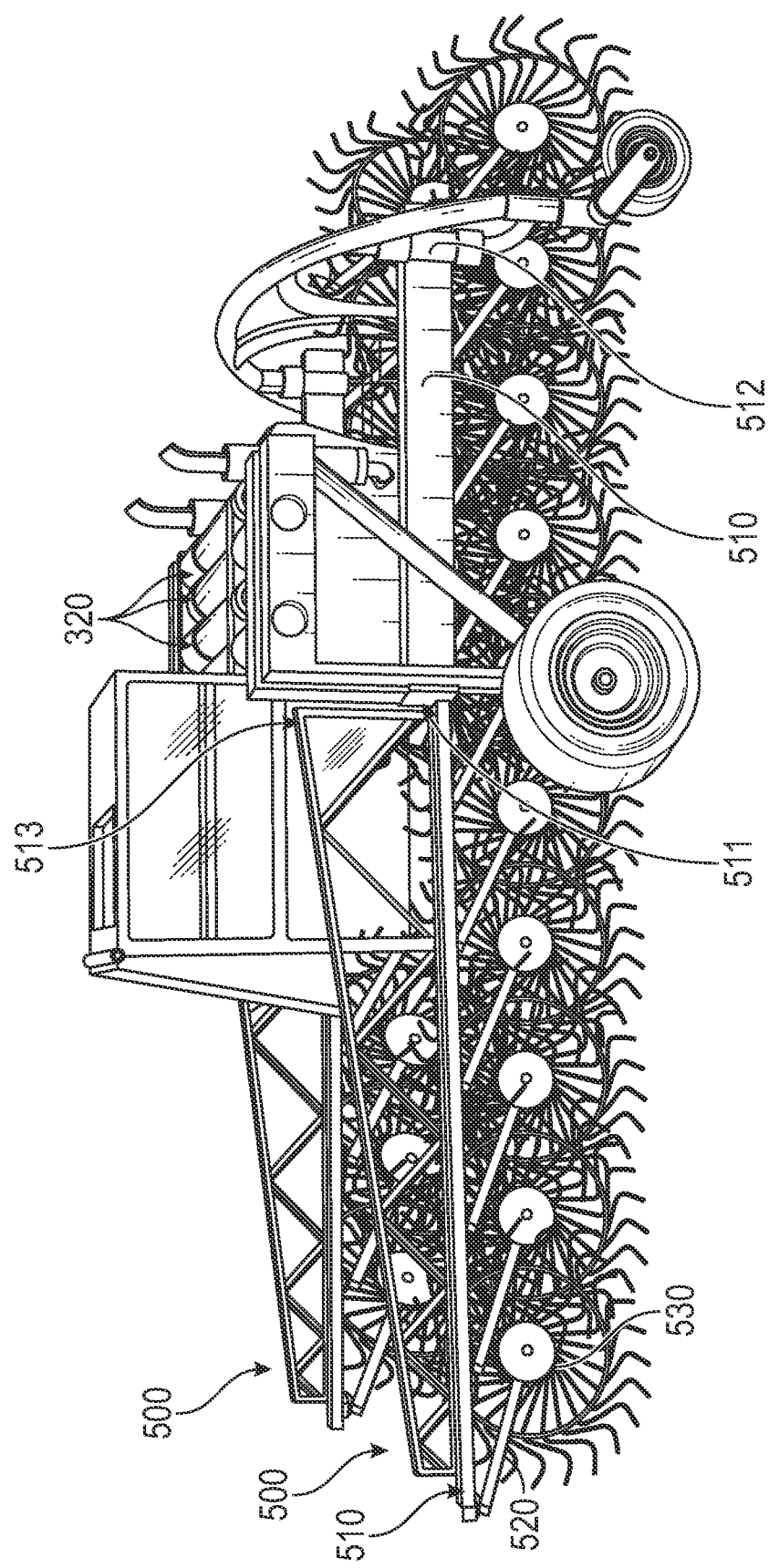
FIG. 5B is a front view of a self-propelled wheel rake of FIG. 2.
Figure 6:
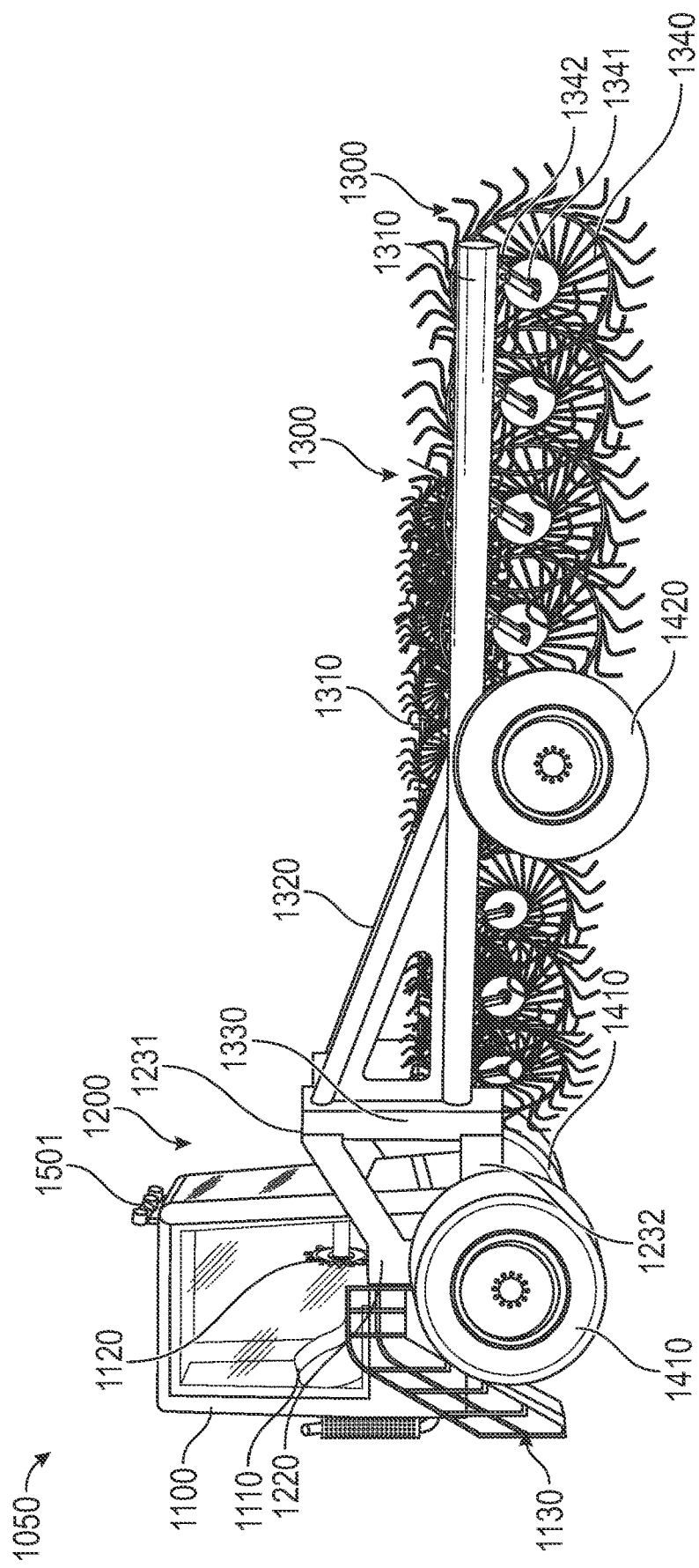
FIG. 6 is a side view of another self-propelled wheel rake configured in accordance with one or more embodiments of the present invention.

FIGS. 5A and 5B provide an example of how rake arm assemblies 500 may be configured in one or more embodiments. Each rake arm assembly 500 can include a rake arm 510 that extends along one side of wheel rake 50. Rake arm 510 can be supported by support arm 401 and the respective vertical support assembly 330 and can extend frontwardly beyond cab 100. Tine arms 520 can be coupled along rake arm 510 and can support tine wheels 530. Tine arms 520 can be actuated (e.g., hydraulically) to raise and lower tine wheels 530 individually or collectively, as desired.

Rake arm 510 can include or form a front coupling point 511 and a rear coupling point 512. In some embodiments, front coupling point 511 may be in the form of a cylindrical opening through which inner vertical support member 331 extends and rotates. Similarly, rear coupling point 512 may be in the form of a cylindrical opening through which coupling member 402 extends and rotates. In some embodiments, a truss 513 can be coupled along the portion of rake arm 510 that extends frontwardly beyond vertical support assembly 330 and may reinforce this portion of rake arm 510.

In FIG. 5B, actuators 320 have been driven to cause rods 322 to be pulled into cylinders 321 thereby causing rake arms 510 to be pivoted inwardly around rear coupling point 512 and into a parallel position relative to cab 100. With rake arms 510 in this parallel position, wheel rake 50 can be driven to a desired location (e.g., along a road to a field where raking will be performed). Upon reaching the desired location, actuators 320 can be driven to cause rods 322 to be extended from cylinders 321 thereby causing rake arms 510 to be pivoted outwardly into the V-shaped position shown in FIG. 5A. With rake arms 510 in this V-shaped position, wheel rake 50 can be propelled along the ground to rake hay into windrows.

In some embodiments, wheels 334 may not be steerable and in such cases, wheel rake 50 may be propelled forward as rake arms 510 are pivoted outwardly and inwardly to minimize side-to-side skidding of wheels 334. In other embodiments, wheels 334 may be steerable to allow rake arms 510 to be pivoted outwardly and inwardly without propelling wheel rake 50 frontwardly and without causing wheels 334 to skid along the ground.

A control system of wheel rake 50 may be configured to drive wheels 334 (e.g., hydraulically) to cause wheel rake 50 to turn. For example, wheels 334 may be driven in opposite directions to cause wheel rake 50 to turn around an axis that is centered between wheels 334 and below cab 100 (i.e., to perform a zero radius turn). As another example, the control system could be configured to drive only the wheel 334 on the outside of the turn such that wheel rake 50 pivots around the inside wheel. In either case, rear wheels 403 can freely turn relative to support arm 401 to facilitate turning. In some embodiments, rear wheels 403 could be drivable to further enhance turning efficiency. In some embodiments, only rear wheels 403 may be drivable to cause wheel rake 50 to turn.

By positioning cab 100 and main body 200 between rake arms 510, wheel rake 50 has a compact length. Likewise, by positioning cab 100 between rake arms 510, the operator can easily see the hay as it is raked and can therefore make speed adjustments on demand such as based on the moisture content of the hay, which may change during a raking session. In comparison, with a prior art wheel rake, the operator is positioned inside a tractor at a substantial distance in front of the hay that is being raked and therefore would need to stop raking and exit the tractor to determine if any adjustments should be made.

In some embodiments, a wheel rake may not include a cab. For example, cab 100 could be replaced with an open platform in which controls 113 and seat 114 may be located. In such embodiments, the open platform would still provide an open view of the hay being raked.

In some embodiments, the position of various components of wheel rake 50 may be altered from what is represented in the figures. For example, the position of wheels 334 and rear wheels 403 could be swapped such that the rear wheels are driven while the front wheels are casters or otherwise undriven. In such embodiments, the positions of cab 100 and main body 200 could also be swapped. With cab 100 behind main body 200, door 120 could be oriented rearwardly and frontward oriented windows could be provided in enclosure 110 to enable the operator to see frontwardly overtop main body. In this configuration, the operator may be able to better see the windrow as it is being formed given that he or she may be directly above it.

In some embodiments, controls 113 may allow each tine arm 520 to be independently controlled such that each tine wheel 530 may be raised or lowered independent of each other tine wheel 530. In such cases, the operator could manipulate controls 113 to cause multiple windrows to be formed at the same time (e.g., by raising tine wheels 530 in the middle of each rake arm 510 so that two additional windrows are formed to the sides of the primary windrow).

In some embodiments, each rake arm 510 may be configured to pitch frontwardly or rearwardly to facilitate raking hay on a hill. In such embodiments, controls 113 may allow the operator to adjust the pitch such as to lift the fronts of rake arms 510 when approaching an upward slope. Alternatively, rake arms 510 may be configured to automatically pitch with the slope of the terrain.

FIGS. 6-10B are different views of another self-propelled wheel rake 1050 (or wheel rake 1050) that is configured in accordance with embodiments of the present invention. Wheel rake 1050 includes a cab 1100 that may be mounted to or otherwise secured to a main body 1200. Cab 1100 can house one or more engines, motors, or other powerhouses for propelling wheel rake 1050 along the ground and driving its various components. Wheel rake 1050 may also include rake arm assemblies 1300 that are supported from main body 1200. A pair of wheels 1410 can be coupled to main body 1200 to support main body 1200 off the ground, and a wheel 1420 can be coupled to each rake arm assembly 1300 to support the respective rake arm assembly 1300 off the ground.

Figure 7:
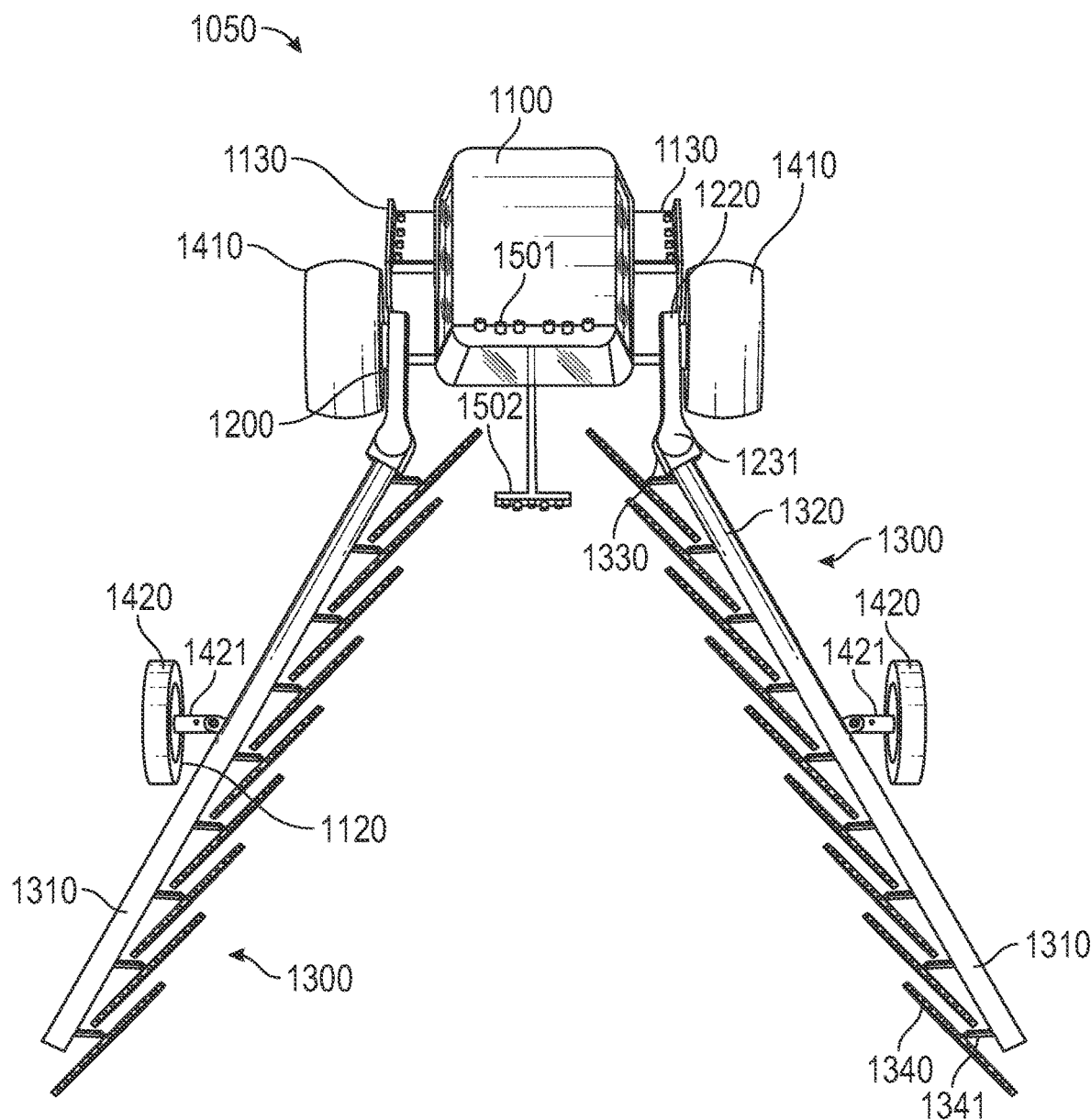
FIG. 7 is a top view of the self-propelled wheel rake of FIG. 6.
Figure 8:
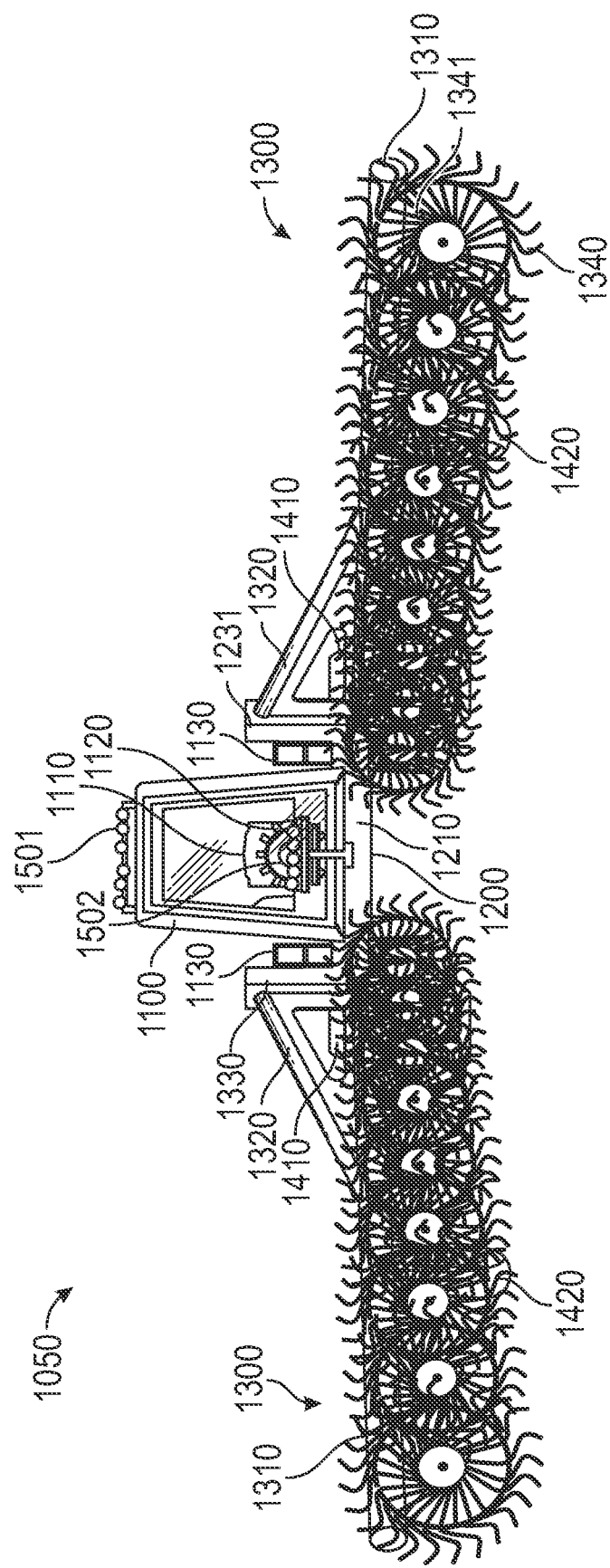
FIG. 8 is a front view of the self-propelled wheel rake of FIG. 6.

Cab 1100 is mounted to main body 1200 to be positioned behind rake arm assemblies 1300 so that an operator inside cab 1100 can easily view hay as it is being raked. The interior of cab 1100 may include a chair (or seat) 1110 and a steering component 1120 (e.g., a steering wheel with or without foot pedals). Steering component 1120 can be adjustable to allow the operator to steer wheel rake 1050 while seated in chair 1110 or while standing. For example, steering component 1120 can include multiple pivot points 1121 for pivoting frontward and backward and for pivoting up and down. Steering component 1120 can further include food pedals for hands-free steering while seated in chair 1110 or while standing. The interior height of cab 1100 can be sufficient to allow the operator to stand such as at least six feet, six inches. Cab 1100 may include windows on all sides to allow the operator to look out from cab 1100 in any direction. As best seen in FIG. 7, stairs 1130 may extend along both sides of cab 1100 to allow the operator to enter cab 1100 from either side.

In some embodiments, a wheelchair lift may be integrated into cab 1100 or any other cab of a wheel rake configured in accordance with embodiments of the present invention. For example, a wheelchair lift may be secured at the rear side of the cab and may facilitate operation of the wheel rake by individuals in wheelchairs or who are otherwise unable to climb stairs. In such embodiments, the rear side of the cab may include a door (or opening) through which a wheelchair may enter when the wheel chair lift is elevated. Also, the cab may not include a chair (or may have the chair removed) to accommodate the wheelchair. In some embodiments, a cab may include a wheelchair lift and one or more sets of stairs as well as a removable chair to thereby accommodate operation by individuals in wheelchairs and individuals without wheelchairs.

Figure 10A:
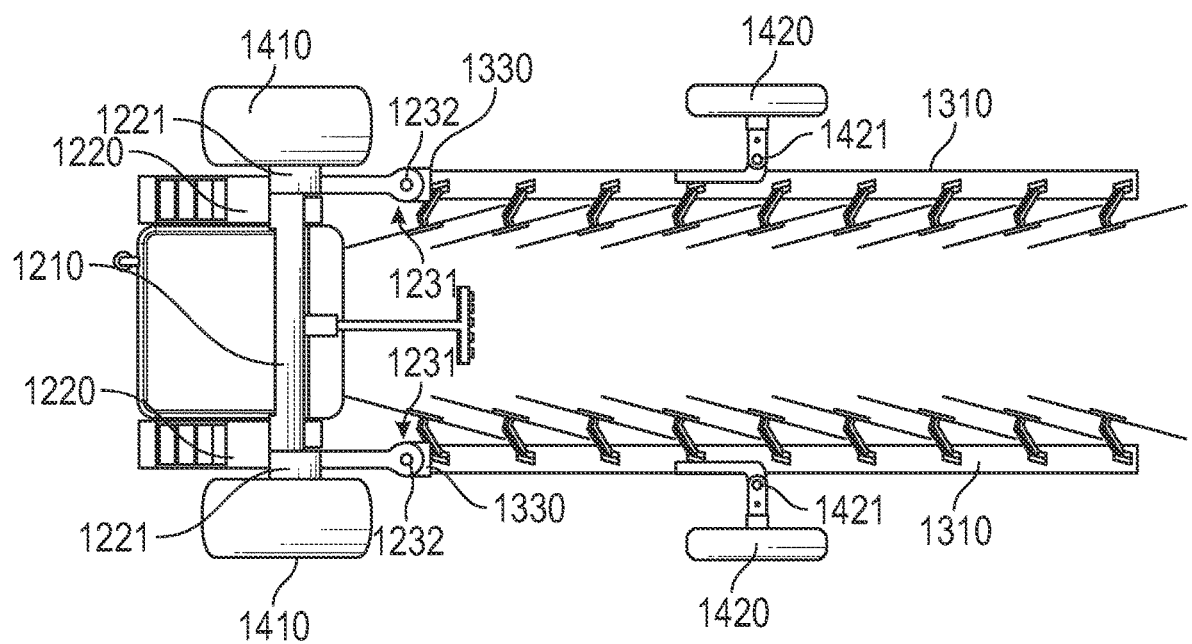
FIGS. 10A and 10B are bottom views of the self-propelled wheel rake of FIG. 6 with the rake arms in the closed and open positions respectively.
Figure 10B:
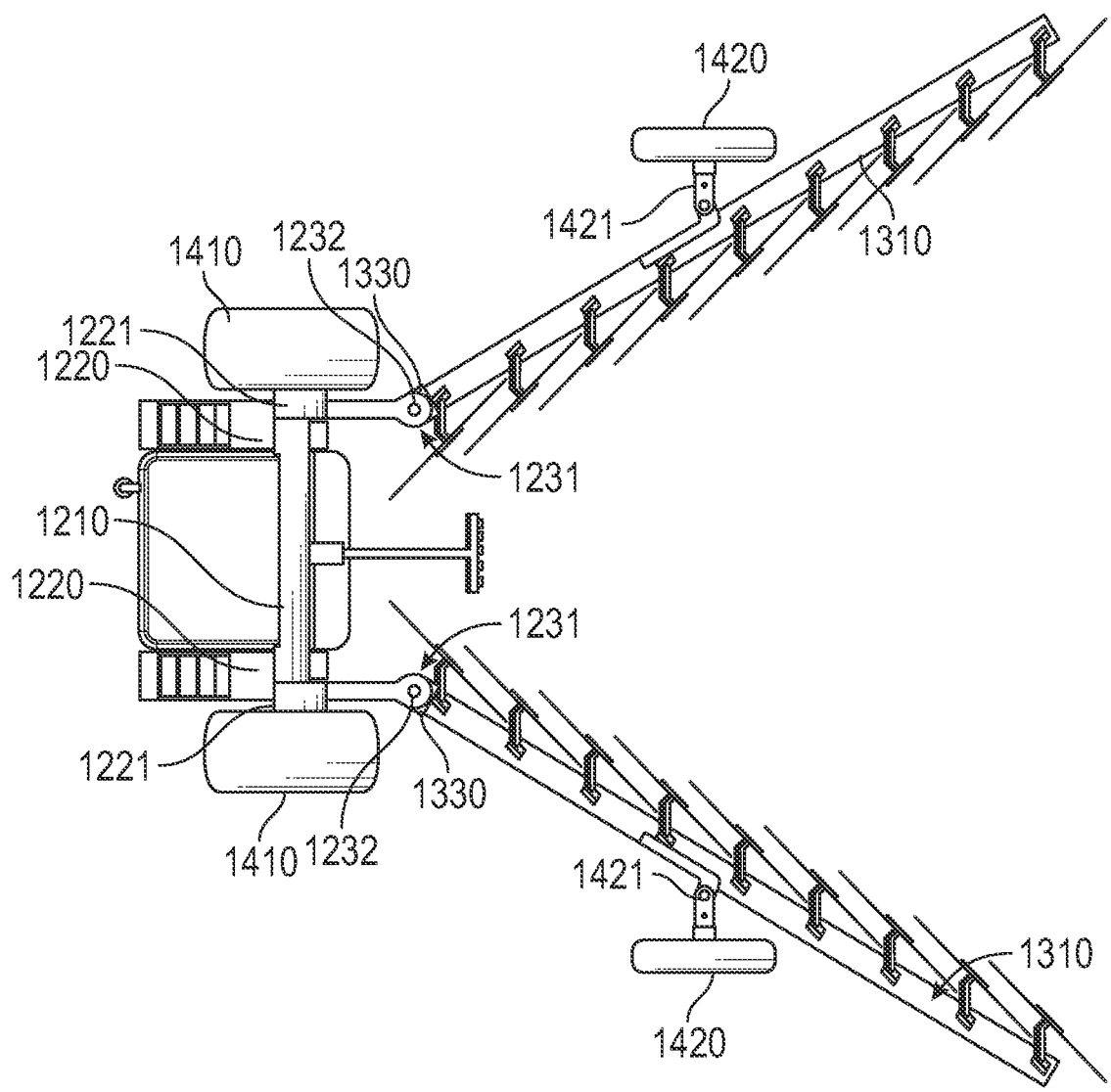

As best seen in FIGS. 10A and 10B, main body 1200 includes a cross support 1210 that extends between wheels 1410 and on which cab 1100 may be supported. Main body 1200 can also include vertical supports 1220 that are positioned on opposite ends of cross support 1210. A lower end 1221 of each vertical support 1220 can extend below cross support 1210. Wheels 1410 can be connected to main body 1200 at lower ends 1221. An upper support arm 1231 and a lower support arm 1232 can extend frontwardly from each vertical support 1220 to form a connection point for each rake arm assembly 1300.

Each rake arm assembly 1300 includes a rake arm 1310 from which tine wheels 1340 are supported. A tine wheel arm 1341 may connect each tine wheel 1340 to rake arm 1310 at a pivot point 1342 thereby allowing each tine wheel 1340 to be independently raised and lowered. In some embodiments, a bar or other member may couple to each tine wheel arm 1341 to allow each tine wheel 1340 to be raised or lowered synchronously.

A rear end of rake arm 1310 may connect to a lower end of a vertical connection member 1330. A reinforcing arm 1320 may extend between an upper end of vertical connection member 1330 and an intermediate point of rake arm 1310. In some embodiments, this intermediate point may be where wheel 1420 connects to rake arm 1310 and could be the midpoint between the rear and front end of rake arm 1310 or frontward of this midpoint to better support the weight of rake arm 1310.

Figure 9:
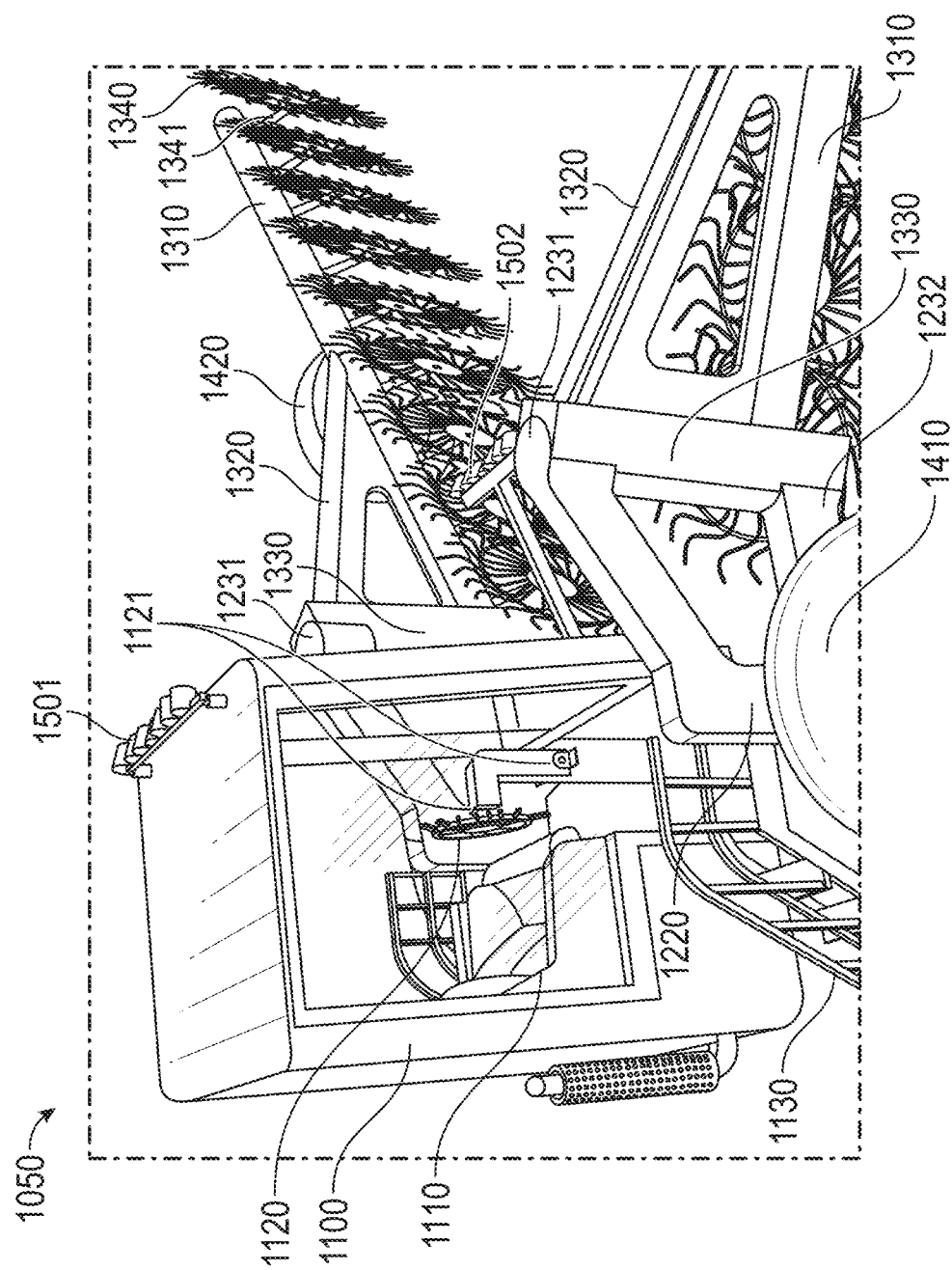
FIG. 9 is a side view of the self-propelled wheel rake of FIG. 6.

As best shown in FIG. 9, vertical connection member 1330 may rotate around an axis defined by the front ends of upper support arm 1231 and lower support arm 1232. In other words, upper support arm 1231 and lower support arm 1232 can be configured to form an axis around which rake arm 1310 pivots. In some embodiments, vertical connection member 1330 may form a cylindrical shape into which upper support arm 1231 and lower support arm 1232 (or another component extending between these arms) extend to couple rake arm assembly 1300 to main body 1200. Because this pivoting connection between rake arm assembly 1300 and main body 1200 is in front of cab 1100, the operator will have full visibility of rake arm 1310 and wheel tines 1340 and therefore full visibility of the windrow.

Wheel rake 1050 can include a control system that allows each rake arm assembly 1300 to be independently pivoted relative to main body 1200. In particular, as the operator steers wheel rake 1050, the control system can independently control the angle of each wheel 1420 which in turn will independently pivot the respective rake arm assembly 1300 to maximize the efficiency of the turn. In some embodiments, the steering of each wheel 1420 about a pivot point 1421 (see FIGS. 10A and 10B) could be controlled electronically such as via an electronically controlled actuator included in each rake arm 1310. In some embodiments, the steering of each wheel 1420 about pivot point 1421 could be controlled mechanically such as via tie rods and pitman arms. In some embodiments, the steering of each wheel 1420 about pivot point 1421 could be controlled by articulated steering and respective front and rear rack and pinion steering components, such that wheel rake 1050 is equipped with dual steering components and functionality. As such, wheel rake 1050 is configured and enabled to follow the gradual tightening radius of a standard pivot irrigation system.

In some embodiments, and in contrast to what is shown in FIGS. 6-10B, each wheel 1420 can be coupled to the respective rake arm 1310 via a connection that allows the wheel to rotate 360 degrees around the connection point (e.g., a caster). Such a configuration can facilitate the turning of the wheel rake when the rake arms are fully open. For example, when performing a sharp turn with the rake arms fully open, the wheel on the inside of the turn may need to pivot up to or beyond parallel with the rake arm to avoid being dragged/pushed through the turn. By coupling wheels 1420 in this manner, they can follow the natural direction of the turn regardless of the angle of the rake arm.

Wheel rake 1050 may include lights in various locations. For example, lights 1501 can be positioned on top of cab 1100 and lights 1502 may extend frontwardly from a lower portion of cab 1100. Lights 1501 may generally illuminate in front of cab 1100 while lights 1502 can provide additional illumination immediately in front of and below cab 1100. Although not shown, one or more lights may be positioned on/along rake arms 1310.

In some embodiments, rake arm assembly 1300 may include a separate arm to which tine wheels 1340 are connected. This separate arm may be connected to rake arm 1310 by a linear actuator that allows the separate arm to be raised and lowered relative to rake arm 1310. In such embodiments, rake arm 1310 may be shortened. For example, rake arm 1310 may extend up to wheel 1420. In such embodiments, reinforcement arm 1320 may extend overtop but spaced from rake arm 1310. The linear actuator, such as a hydraulic cylinder, may extend between rake arm 1310 and reinforcement arm 1320.

In some embodiments, a wheel rake configured in accordance with embodiments of the present invention may include a speed control lever inside the cab such as on a steering column. In some embodiments, the cab may include pedal steering in place of or in addition to a steering wheel.

In some embodiments, the main body and/or rake arm assemblies of a wheel rake may be configured to allow each rake arm to independently pivot up and down to thereby follow the contour of the ground over which the wheel rake travels. For example, in the context of wheel rake 1050, each rake arm assembly 1300 could be coupled to main body 1200 via a pivoting connection. As one example only, the portion of vertical supports 1220 from which upper support arm 1231 and lower support arm 1232 extend could be configured to rotate around cross support 1210 or an axis parallel with cross support 1210.

In some embodiments, a wheel rake may include a steering assembly that enables over steering on one side to compensate for differences in the angles of the two rake arms during a turn. For example, FIG. 16 provides an example of a steering assembly 1600 in the context of wheel rake 1050. However, steering assembly 1600 could be used on any wheel rake where the wheels on the rake arms are actively steered. In FIG. 16, one rake arm 1310 is shown in isolation to simplify the figure. However, a symmetrical configuration would exist on the other rake arm 1310.

Steering assembly 1600 includes a double-ended cylinder 1601 (which may be hydraulically, electrically, or otherwise actuated) having its ends connected to opposing pitman arms 1602 (only one of which is shown). Steering assembly 1600 also includes an inner tie rod 1603a that is connected to an outer tie rod 1603b via a telescoping interface. For example, an outer end of inner tie rod 1603a may have a narrowed diameter to allow it to insert into outer tie rod 1603b or vice versa. The outer end of outer tie rod 1603b is coupled to pivot point 1421 such that wheel 1420 is steered based on the linear movement of outer tie rod 1603b. A spring 1604 is positioned at the telescoping interface with its ends secured to inner tie rod 1603a and outer tie rod 1603b. Spring 1604 can have a relatively high spring constant such that it will resist compression and stretching absent a relatively large force. For example, spring 1604 can resist compression between inner tie rod 1603a and outer tie rod 1603b when inner tie rod 1603a is pushed outwardly towards outer tie rod 1603b until inner tie rod 1603a is pushed beyond a threshold amount. Likewise, spring 1604 can resist stretching when inner tie rod 1603a is pulled inwardly away from outer tie rod 1603b until inner tie rod 1603a is pulled beyond a threshold amount. Accordingly, spring 1604 enables the total length of inner tie rod 1603a and outer tie rod 1603b to dynamically change at the extremes of double-ended cylinder 1601's movement without changing the angle of wheel 1420 relative to rake arm 1310.

Figure 11:
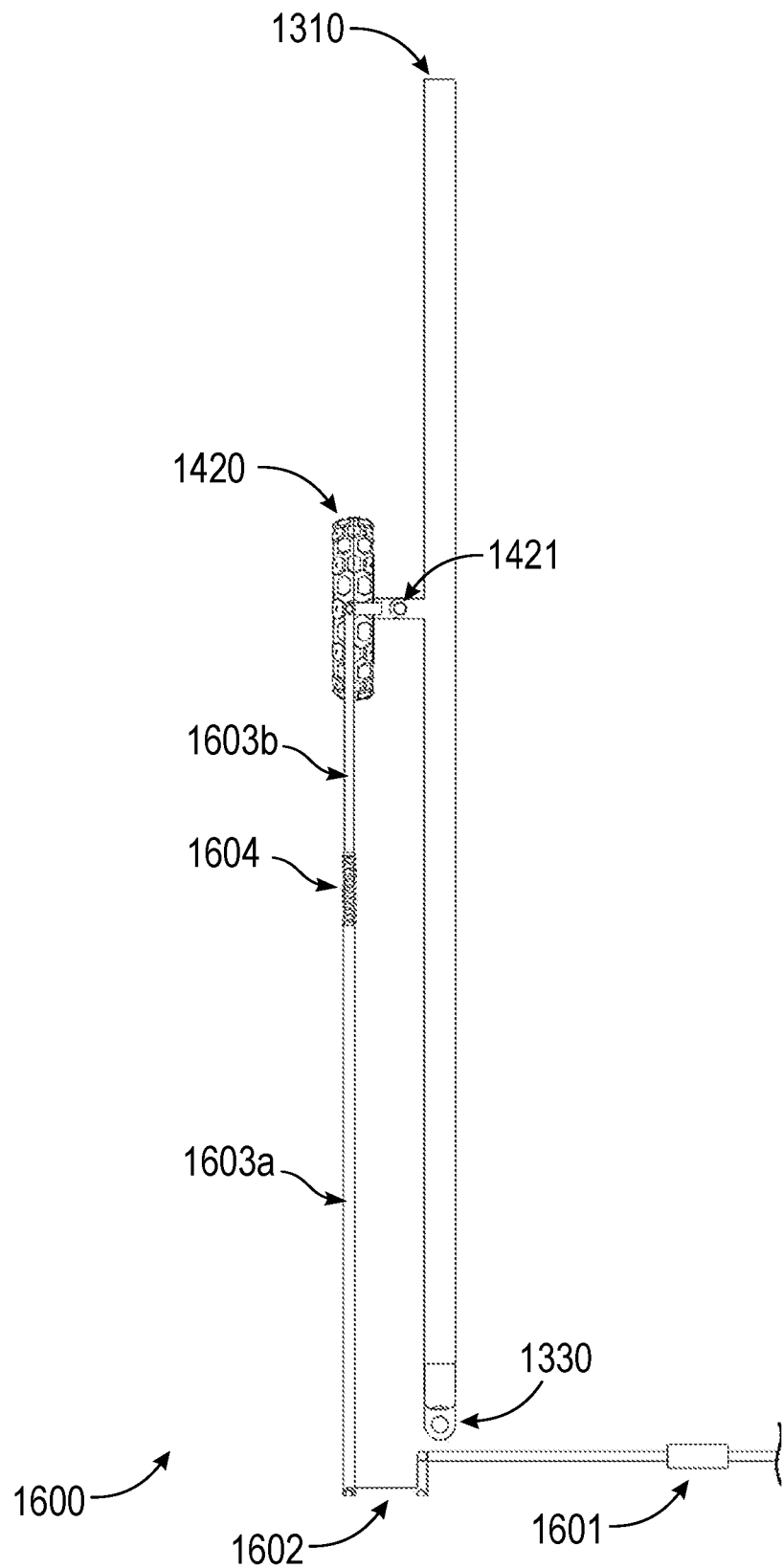
FIG. 11 is a top view of a steering assembly of a wheel rake in accordance with one or more embodiments of the present invention.

More specifically, in the context of FIG. 11, when double-ended cylinder 1601 is pulled rightward, the depicted left-side pitman arm 1602 will pivot to push inner tie rod 1603a outward/forward. Initially, the force applied by inner tie rod 1603a on spring 1604 will be insufficient to substantially compress spring 1604 such that outer tie rod 1603b will be pushed outwardly/forwardly in a corresponding amount to turn wheel 1420 to the right. Then, as wheel 1420 reaches a rightward threshold, which may occur before double-ended cylinder 1601 has fully travelled to the right, the continued outward/forward movement of inner tie rod 1603a may create a force sufficient to compress spring 1604 against outer tie rod 1603b rather than causing a corresponding (e.g., linear) movement of outer tie rod 1603b that may damage/stress pivot point 1421 or the other structural components at wheel 1420 on the left rake arm 1310 during the right turn. Importantly, while this spring 1604 on the left side is being compressed, spring 1604 on the right side can enable the outer tie rod 1603b on the right side to continue moving substantially linearly with the inner tie rod 1603a such that wheel 1420 on the right side can turn further rightward relative to the right rake arm 1310 in comparison to wheel 1420 on the left side relative to the left rake arm 1310. Stated another way, during this sharp right turn, the total length of inner tie rod 1603a and outer tie rod 1603b on the left side can dynamically shorten relative to the total length of inner tie rod 1603a and outer tie rod 1603b on the right side thereby causing the respective wheels to be oriented at different relative angles. Then, after the turn, or at least after the turn is not as sharp, springs 1604 can allow the respective inner and outer tie rods 1603a/1603b to return to their neutral positions. This same process can occur when a left turn is performed.

Steering assembly 1600 may be particularly beneficial when sharp turns are performed when rake arms 1310 are in an open position. For example, when rake arms 1310 are fully open, wheels 1420 will be spaced apart at such a distance that their ideal angles for performing a sharp turn will not match. In particular, the wheel 1420 on the inside of the turn will need to turn farther relative to the respective rake arm 1310 than the wheel 1420 on the outside of the turn. The use of springs 1604 enable this over turning on one side without the risk of damage/stress to the components on the other side.

Figure 1:
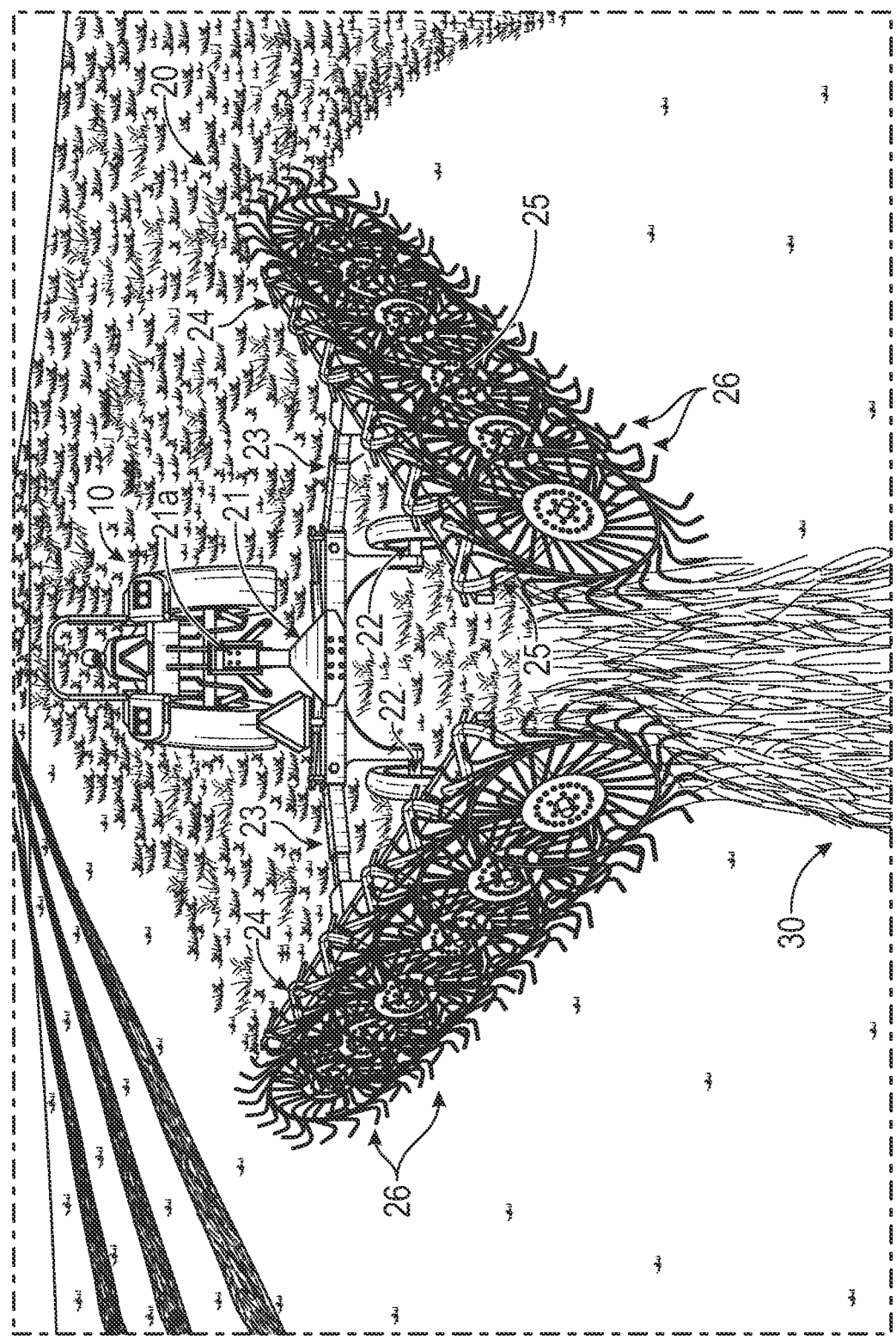
FIG. 1 is a rear view of a tractor pulling a prior art wheel rake.

A wheel rake configured in accordance with embodiments of the present invention provides a number of benefits in comparison to traditional wheel rakes. For example, traditional wheel rakes, such as shown in FIG. 1, are pulled by a tractor and therefore the tractor and the wheels of the wheel rake run over the hay before it is raked. In comparison, wheel rake 50 does not run over the hay because it is self-propelled. For example, as can best be seen in FIGS. 5A and 10B, the wheels are positioned outside of the tine wheels such that they will not run over the hay, whether before or after raking.

Additionally, because traditional wheel rakes are pulled by tractors, they make very large turns and run over significant amounts of hay in doing so. In comparison, a wheel rake configured in accordance with embodiments of the present invention, which may be one-third the length of a tractor and traditional wheel rake, can make very tight turns, including zero radius turns, to minimize the amount of hay that is run over during a turn or avoiding running over hay altogether.

A wheel rake configured in accordance with embodiments of the present invention also enables unique hay raking techniques to be performed. For example, wheel rake 50 and wheel rake 1050 can be self-propelled along a field to create two parallel windrows without running over the unraked hay or the windrows. In some cases, the two parallel windrows could be formed 4.5 feet apart or another close distance relative to the span of the rake arms. This could be accomplished by lifting appropriate tine wheels to form the parallel windrows in a single pass or by making multiple passes across the field. The hay could be raked into these parallel windrows as soon as the ground is dry after cutting the hay so that the dry ground can pull moisture from the windrows (e.g., 24 hours after cutting the hay). The hay in the parallel windrows can then be allowed to partially dry (e.g., for another 24 hours). Then, the wheel rake can again be used to rake the parallel windrows into a single windrow. This second raking can facilitate even drying by flipping over the parallel windrows as the single windrow is formed and by forming the single windrow on dry ground. Again, the design of the wheel rake allows this raking to be performed without running over the windrows.

In addition to facilitating even drying, this raking technique also minimizes damage to the hay. The leaves of the hay, which contain the most nutrition, are most likely to be damaged and detached when the hay is moved. As the hay dries, the likelihood of this damage increases. By initially raking the hay into two parallel windrows which are spaced closely together, the majority of the movement of the hay is performed while it is still relatively wet and therefore less prone to leaf damage. Then, when the hay has dried and will therefore be more prone to damage, the hay in the two parallel windrows is raked over the shorter distance to form the single windrow. In this way, the hay is turned as it is formed into a windrow without be moved across the full width of the rake arms.

This turning of the hay also minimizes the damage that sunlight would otherwise cause to the hay on top of the windrows. In other words, the raking technique reduces the amount of direct sunlight the hay on top of the originally formed windrows will receive.

This raking technique can also minimize the impact of rain on cut hay. If hay is left unraked to dry and it rains, the rain is likely to soak into all the unraked hay. In contrast, by initially raking the hay into parallel windrows for drying, the windrows can function like a thatched roof to prevent rain from soaking the majority of the hay.

This raking technique can be effectively performed with a wheel rake configured in accordance with embodiments of the present invention because it will not run over the hay. In comparison, if a tractor and traditional hay rake were used to rake hay in this manner, the damage caused by running over the hay and windrows would exceed any benefit the raking technique would otherwise provide.

In some embodiments, the present invention provides a method for raking hay in accordance with a raking technique described herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A wheel rake comprising:
    a main body;
    a cab supported by the main body;
    opposing rake arm assemblies that extend from the main body, each rake arm assembly including a rake arm that is coupled to the main body in front of the cab; and
    a support assembly configured to support the main body, the cab, and the opposing rake arm assemblies, the support assembly comprising:
        a set of rear wheels disposed on either side of the cab and configured to support the main body off the ground; and
        a set of front wheels coupled to the opposing rake arm assemblies in front of the cab and configured to support the rake arms off the ground,
    wherein each rake arm is independently pivotable relative to the main body, and
    wherein the set of front wheels that support the rake arms off the ground comprises a first wheel and a second wheel that are independently steerable.

2. The wheel rake of claim 1, wherein the main body comprises a cross support disposed between a left wheel and a right wheel of the set of rear wheels on which the cab is supported.

3. The wheel rake of claim 2, wherein the main body includes vertical supports on opposite ends of the cross support, wherein a lower end of each of the vertical supports extends below the cross support.

4. The wheel rake of claim 3, wherein the main body includes an upper support arm and a lower support arm that extend frontwardly from each vertical support, the upper support arm being coupled to an upper end of its respective vertical support and the lower support arm being coupled to the lower end of its respective vertical support.

5. The wheel rake of claim 4, wherein each rake arm assembly includes a vertical connection member that is connected to the main body between the respective upper and lower support arms and that is positioned between the set of rear wheels and the set of front wheels of the support assembly.

6. The wheel rake of claim 5, wherein the upper support arm and the lower support arm form an axis around which the rake arm is configured to pivot.

7. The wheel rake of claim 1, wherein each rake arm comprises a plurality of tine wheels, and wherein at least some of the plurality of tine wheels are positioned between the set of rear wheel and the set of front wheels, yet wherein all of the tine wheels are positioned in front of the cab such that an operator of the wheel rake has visibility of each of the tine wheels.

8. The wheel rake of claim 7, further comprising a plurality of tine wheel arms connecting each of the plurality of tine wheels to a respective one of the rake arms at a pivot point allowing each of the tine wheels to be independently raised and lowered.

9. The wheel rake of claim 1, wherein the first and second wheels of the set of front wheels is coupled to the respective rake arms at or in front of a midpoint between a front end and a rear end of each rake arm.

10. The wheel rake of claim 1, wherein each of the first and second wheels of the set of front wheels is configured to rotate 360 degrees around a connection point to allow for the rake arms to move in any direction.

11. The wheel rake of claim 1, further comprising a set of lights comprising:
   lights on top of the cab;
   lights that extend frontwardly from the cab towards a bottom of the cab; and
   lights on each rake arm.

12. The wheel rake of claim 1, further comprising:
   a control system for independently pivoting each rake arm.

* * * * *